United States Patent [19]

McSweeny, Jr.

[11] 4,381,617
[45] May 3, 1983

[54] FISH NET WITH REDUCED BOTTOM FRICTION

[75] Inventor: Edward S. McSweeny, Jr., Homestead, Fla.

[73] Assignee: Weyerhaeuser Company, Tacoma, Wash.

[21] Appl. No.: 220,943

[22] Filed: Dec. 29, 1980

[51] Int. Cl.³ .......................................... A01K 73/02
[52] U.S. Cl. ............................................ 43/9; 43/14
[58] Field of Search .................................. 43/7, 9, 14

[56] References Cited

U.S. PATENT DOCUMENTS

| | | | |
|---|---|---|---|
| 2,203,827 | 6/1940 | Kors | 43/14 |
| 3,058,248 | 10/1962 | Luketa | 43/9 |
| 3,162,967 | 12/1964 | Luketa | 43/9 |
| 3,231,998 | 2/1966 | Luketa | 43/9 |

FOREIGN PATENT DOCUMENTS 710522 2/1963 Canada ..................................... 43/9

Primary Examiner—Nicholas P. Godici
Assistant Examiner—M. Hodak
Attorney, Agent, or Firm—Weyerhaeuser Company

[57] ABSTRACT

The present invention is a means of reducing the hauling force of a bottom contacting fish net by enclosing or draping at least the leadline of the net with a flexible bearing means. This can conveniently be a tube of flexible polyethylene film or a strip of film which wraps under the leadline. The tube has access openings at regular intervals to permit tying the leadline to the net. These openings also permit free egress of air and ingress of water when the net is in use. The tube serves as a bearing for the leadline as it rests against the substrate. This reduces the tendency to dig into the substrate and, in turn, decreases the energy required to haul the net across the bottom.

8 Claims, 7 Drawing Figures

U.S. Patent  May 3, 1983  Sheet 1 of 2  4,381,617
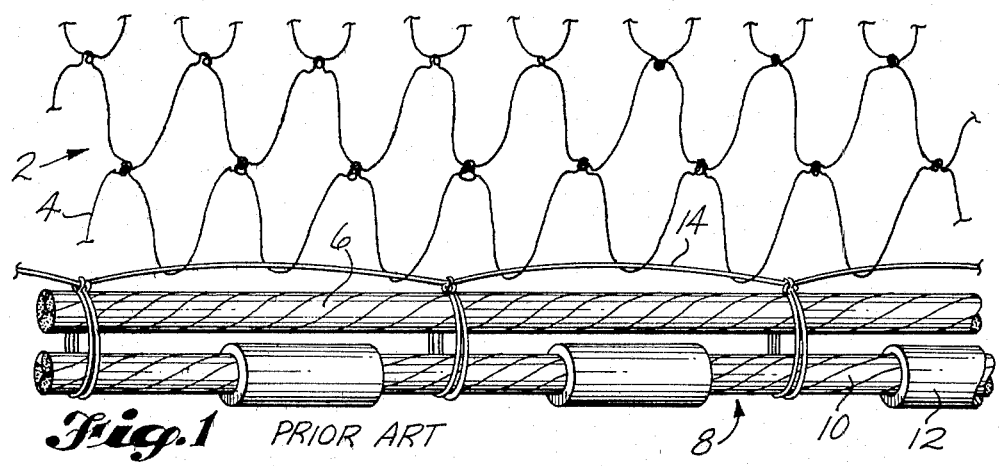
Fig. 1  PRIOR ART
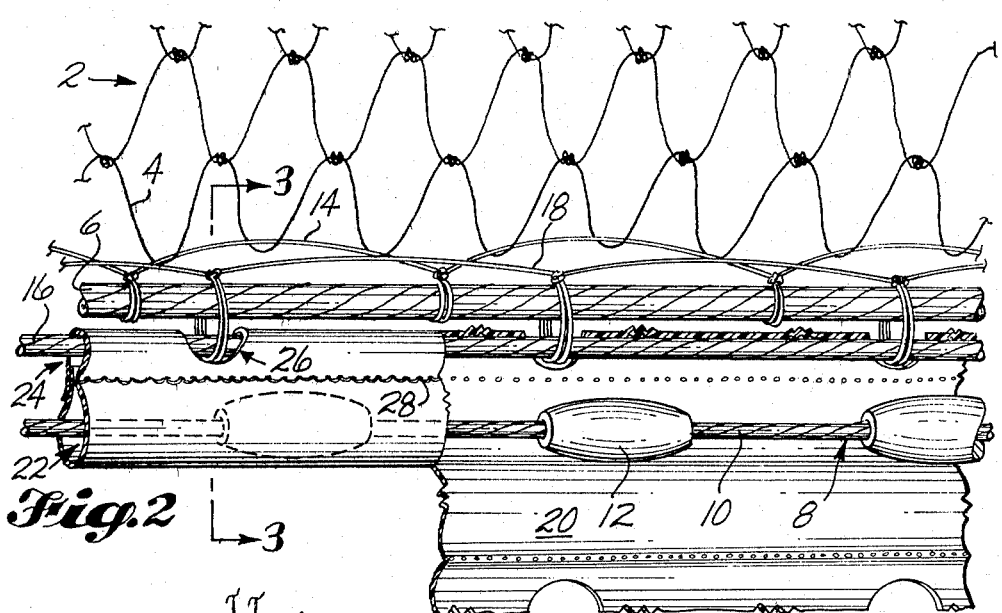
Fig. 2
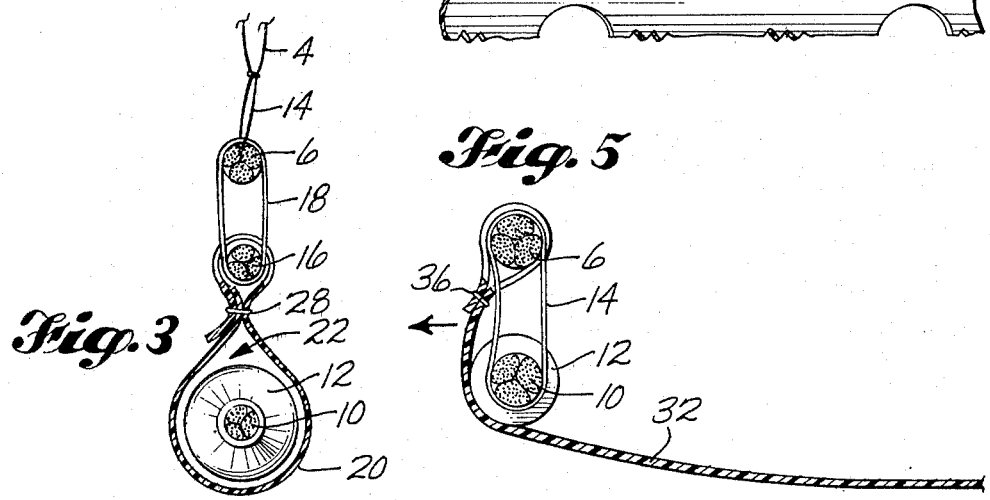
Fig. 3
Fig. 5

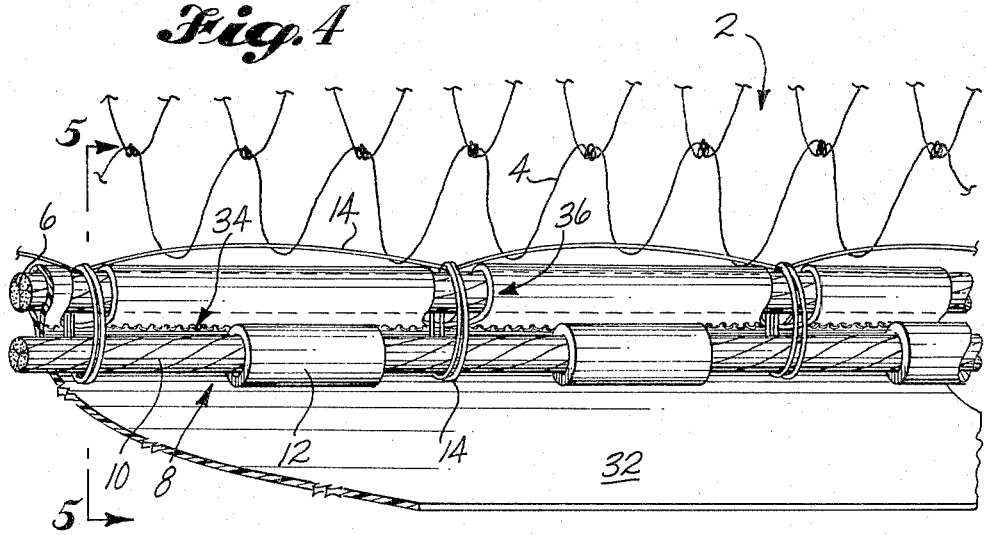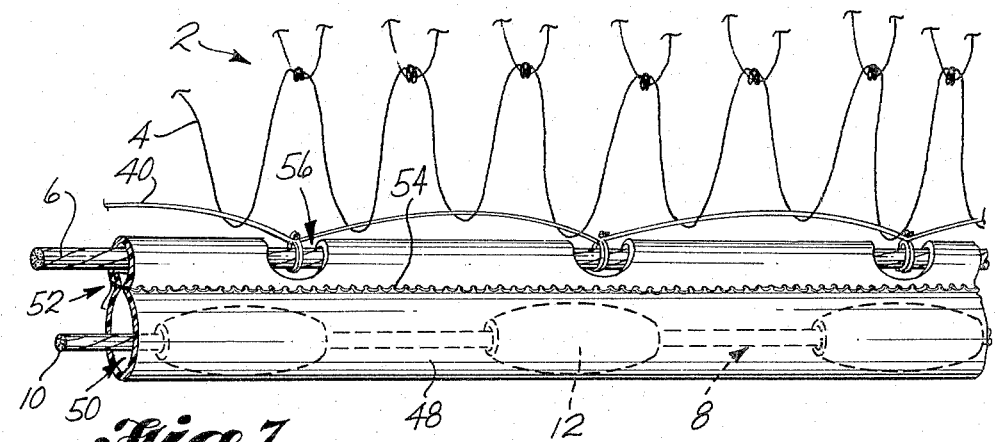

4,381,617

FISH NET WITH REDUCED BOTTOM FRICTION

BACKGROUND OF THE INVENTION

This invention relates to an improvement in bottom-contacting fish nets in which frictional resistance encountered between the net and the substrate is significantly reduced. This results in a reduced hauling energy requirement.

Man has used seines for capturing fish or other aquatic animals from times long before the advent of recorded history. By definition, a seine is a long net which typically exceeds in top-to-bottom height the depth of body of water in which it is used. The bottom of the siene is weighted to keep it in contact with the substrate. The upper part of the siene is normally maintained on or near the surface by floats or other buoyant means. Seines are of various types, but they all operate in a fashion in which they enclose or trap the aquatic life being harvested. The entrapment is often accomplished by towing one end of the seine around the circumference of a given area until it meets the opposite end. The enclosure can then be drawn onto land to recover the enclosed creatures. Alternatively, the diameter can be made progressively smaller so that the entrapped creatures are concentrated and can be recovered by dip nets or other means. Seines are also used to recover fish or other aquatic animals which have been farmed in ponds or raceways. The latter are long rectangular tanks which are rarely more than two meters in depth. In harvesting fish from a raceway, the seine is placed transversely at one end and drawn lengthwise down the enclosure. The entrapped aquatic creatures are then recovered when the pass is completed at the far end of the raceway.

Another device which may be used for capturing aquatic creatures is the trawl. The trawl is a wide, funnel-shaped net in which the mouth is held open by a framework, floats, paravanes or some other means. The trawl can be drawn through the water at any desired depth. Frequently, it too is run in contact with the bottom.

One of the problems with both seines and bottom-operated trawls is the frictional force between the device and the bottom substrate. The frictional effect is exacerbated by the fact that the leadline, which holds the device in contact with the bottom, tends to dig into and then plow through, the substrate. The leadline typically is a cord or line of adequate size and strength which carries cylindrical or ellipsoidal lead weights at regular intervals. It is also frequently found in the form of a steel chain, especially on trawls. The term "leadline" will be used to designate this weighted member regardless of its physical form.

The amount of friction between the net and the bottom has a major effect on the pulling force required to move the device through the body of water. Bottom friction is determined primarily by the physical shape or configuration of the seine or trawl which is in contact with the substrate, and by the nature of the substrate itself. The leadline of a seine or trawl will tend to dig into a muddy or silty substrate far more than it will a hard substrate. In some extreme cases, the device can become stuck or "mudded in" the substrate material to the point that no further forward movement is possible. It is not unknown in these circumstances that an expensive trawl must be abandoned.

Surprisingly, the art does not appear to have broadly addressed the problem of reducing friction with the bottom. U.S. Pat. No. 3,058,248 discloses the use of a rubber-cased rolling bobbin which is designed to keep the ground line of the trawl net close to, but somewhat off the bottom. U.S. Pat. No. 3,231,998 also shows a rolling device to keep the ground line of a trawl free of the substrate. The latter patent also teaches the use of a resilient tickler line which rides on the bottom ahead of the mouth of the trawl in order to startle bottom-dwelling fish so that they swim up into the net.

SUMMARY OF THE INVENTION

The present invention comprises a means of reducing the pulling force of a bottom-contacting fish net by decreasing the friction between the net and the substrate. This is accomplished by the use of a flexible bearing means which encloses at least the leadline of the net. The bearing means enables tight contact with the substrate and it supplies an increased bearing surface to reduce or prevent any tendency of the leadline to dig into the substrate. This bearing means can be of the nature of a flexible tubing-like structure which encloses at least the leadline and perhaps an attachment line and the foot rope of the net as well. The bearing means may also simply be an open-ended flexible strip which is attached at the bottom of the net and is wrapped around underneath the leadline. Where the bearing means is tubular, it should contain openings to permit free ingress of water and to allow air to escape. These same openings may also provide tying access for joining the leadline to the net. When the bearing means is tubular in form, it may also be divided into longitudinally parallel compartments. One of these may contain a leadline and the other an attachment line which is in turn tied to the foot rope of the net. The second tubular compartment may also contain the foot rope. Where the bearings means is tubular, that part enclosing the lead line should be of substantially larger diameter than the leadline. By substantially is meant that it is at least approximately twice the diameter of the leadline. In the case of a cordage line with weights, the diameter of the compartment would be at least twice the diameter of the weights, rather than the cordage. If the leadline is a chain, the diameter of the compartment would need to be at least twice the breadth of the individual links.

The bearing means may be a flexible plastic film or a smooth surfaced fabric. In the case of plastic film, polyolefin films having a thickness in the range of about 0.10–0.25 mm (0.004–0.010 in) are usually satisfactory. Lighter nets, such as a hand-pulled seine, would typically take a lighter film than would a heavy bottom trawl. Fabrics such as nylon, polypropylene, polyesters or acrylics perform very well due to their high strength and low coefficient of friction.

It is an object of this invention to provide a means for reducing the friction between the substrate and a bottom-contacting fish net.

It is another object to provide an enclosure around the leadline of a seine or trawl that acts as a bearing to prevent it from digging into the bottom substrate.

It is a further object to provide a means at the bottom of a fish net that both reduces friction with the bottom substrate and acts as a seal to prevent escape of aquatic life under the net.

It is still another object to provide a fishing seine or trawl that reduces the hauling energy.

These and other objects will become readily apparent by reference to the following drawings and description.

BRIEF DESCRIPTION OF THE DRAWINGS

FIG. 1 shows an elevation view of the typical fashion in which a leadline is secured to the foot rope at the bottom or substrate-contacting portion of a net.

FIG. 2 shows a partially cutaway elevation of one version of the present invention in which the leadline is enclosed in one compartment of a flexible tube while an attachment line in a parallel tube is served to the foot rope of a net.

FIG. 3 is a view through Section 3—3 of FIG. 2.

FIG. 4 is an elevation view of an alternative use of a bearing means in which an open-ended flexible strip is secured to the net foot rope.

FIG. 5 is a view through Section 5—5 of FIG. 4 showing how the flexible strip acts as a bearing for the leadline.

FIG. 6 is an elevation view showing a construction in which the net foot rope and leadline are contained within a single, flexible tube.

FIG. 7 is an elevation view showing yet another alternative construction using a two-compartment flexible tube.

DESCRIPTION OF PREFERRED EMBODIMENTS

This invention concerns an improvement to nets used for capturing fish or other aquatic animals. It is equally applicable to manually-fished seines, to seines fished with mechanical aids such as vessels, shore-mounted winches or tractors, or to bottom trawls.

FIG. 1 illustrates the construction of the lower edge; i.e., the bottom or substrate-contacting edge, of a seine. The seine, generally indicated at 2, consists of cordage or monofilament netting 4 which is tied to a foot rope 6. The net is held tight against the substrate by the weight of a leadline, generally indicated at 8. This consists of a cord or line 10 of adequate strength bearing lead weights 12. These weights may be free to move on the leadline, but typically they are crimped or tied in place. The leadline 8 and foot rope 6 are tied to the bottom of netting 4 by hanging twine 14.

In use, one common fault of such nets is that they tend to hang up on irregularities found on the bottom. A more serious problem occurs on soft bottoms where the net tends to dig into the sediment because the surface or bearing area presented by the bottom of the net is small in relation to the weight of the leadline. This tendency to dig into the substrate results in increased drag and requires greater force to move the net. In some cases, this may slow the net or stop it altogether. With both seines and trawls, this effect can impose limits on the length or area of the net, or the speed at which the net is pulled. The net effect of all of these limitations is to reduce the catch per unit of effort or energy expended.

FIGS. 2 and 3 illustrate an embodiment of the invention which assists in overcoming the above problems. The net and the foot rope are similar to that illustrated in the earlier figure. Here, however, the leadline 8 and a separate attachment line 16 are enclosed in a loose, flexible plastic or fabric sheath 20. In this case the leadline is free and the supplementary attachment line is fixed to the foot rope 6 by hanging line 18. The sheath 20 is formed into a leadline compartment 22 and attachment line compartment 24 by joining means 28. In the illustration shown, the tubes are created by a line of stitches 28 sewn longitudinally in the plastic film. Attachment cutouts 26 allow the supplementary attachment line 16 to be tied to the foot rope 6. These cutouts also serve to allow entry of water into the structure so as to prevent ballooning by retained air. Similar openings may also be made in the leadline compartment 22 to allow free entry of water and exit of air. These are especially desirable if the net is long. In shorter nets, this ingress and egress can readily occur through the open ends of leadline compartment 22, as is shown in the present drawing.

FIG. 6 shows another version in which the bearing or sheath is formed or extruded as a single tube which encloses both the foot rope and the leadline. In this case, the sheath 38 has cutouts 40 through which the hanging twine 42 is used to attach the foot rope to the netting 4. Additional tie lines 44 serve to fix the leadline to the foot rope. In many cases this structure will be preferred because of its simplicity.

Another version of the invention is shown in FIG. 7. This is somewhat similar to the embodiment displayed in FIG. 2, except that no supplementary attachment line is needed. Here, the plastic film or fabric 48 is formed into a lower or leadline compartment 50 and a hanging line compartment 52. The compartments are created by joining means 54. In this case, as before, the individual tubes are shown as being created by longitudinal stitches or sewing. It should be understood that other means of forming the tubes are considered as equivalent. These might be heat sealing, ultrasonic welding or adhesive bonding, to name but a few of the methods which are suitable. The upper or hanging line compartment contains cutouts 56 through which the hanging twine 40 is used to tie the assembly to the bottom edge of the net.

An alternative and somewhat simpler method is illustrated in FIGS. 4 and 5. In this case a sheet of plastic film or fabric 32 is formed into a compartment which encloses foot rope 6 by joining means 34. Attachment cutouts 36 permit the foot rope and a leadline to be tied to the bottom of net 4 by hanging twine 14. In use, as is best shown in FIG. 5, the plastic film or fabric simply wraps underneath the leadline to provide additional bearing surface.

The material from which the bearing means is made is not critical. Typically it can be made from polyethylene film. A preferred version uses black polyethylene film which is from 0.10–0.25 mm (0.004–0.010 in.) in thickness. Extremely stiff plastic films should not be used, since they restrict conformation of the leadline with irregular bottoms. Thinner films are more subject to tearing on bottom obstructions, but are more suitable for lighter nets.

The use of the bearing means at the bottom of the net solves a number of problems. First, as has been described, it presents a greatly increased surface area in contact with the substrate, thus providing greater support for the weight of the leadline to prevent it from digging in. Second, by reason of its smooth surface, it reduces the friction generated from contact with the bottom. In addition, the sheath will contain water when submerged. It will thus present a semi-inflated surface in contacts with obstacles, offering less opportunity to snag on projections. Since the sheath is not sealed, the surface will yield in contact with the projection as water is expelled from the sheath to further reduce the likelihood of hanging up or tearing.

The use of the bearing means has given an additional advantage which was quite unexpected. Because of the better seal with the substrate, there is less opportunity for fish or other aquatic animals to escape under the net. A significant improvement in catch efficiencies has been noted when nets of the type described are used in raceways.

The following example will serve to illustrate the improved catch efficiency and the reduced pulling force which is achieved in seines using the present invention. It should be understood that the invention is not limited to seines, but is useful on any bottom-contacting net, such as a trawl, which is drawn through the water in order to enclose or entangle aquatic animals.

EXAMPLE

The leadlines of two seines were sheathed in 0.10 mm (0.004 in.) black polyethylene film approximately as shown in FIG. 6. The sheath formed a loose envelope averaging 6–8 cm in height. These seines were 22.9 m in overall length by 1.8 m in height. One net was made of 2.5 cm (1 in) mesh nylon cordage in which the No. 15 multifilament twine was 1.30 mm in diameter and had a breaking strength of 560 newtons. The other was made of 1.91 cm (¾ in.) No. 139 monofilament 0.4 mm in diameter and with a breaking strength of 67 N. The cordage seine had a 1.8×1.8×1.8 m harvest bag in the center. These nets were tested against similar nets with unsheathed leadlines to determine pulling force and catching efficiency.

Trials were made in raceway ponds for growing the freshwater prawn *Macrobrachium rosenbergii*. Raceways were 81.4 m long, 15.2 m wide, about 0.7 m deep and had silt bottoms. The seines were pulled manually by two men, one on each side of the raceway, using hauling lines attached to a bridle connecting the leadline and floatline of the seine. Scales were used in each hauling line to measure pulling force. Measurements were taken every 4.6 m for about half the length of the pond.

Catch efficiency was measured by first making three sweeps of the pond with the standard net. The highest number of prawns caught on any sweep (rather than the average) was considered as the base value. On subsequent trials, the efficiency was expressed as a ratio determined by dividing the number of individuals caught by the base value. Runs were made several days apart to eliminate any effects of conditioning where the prawns learned to avoid the net.

Pulling forces are reported in Table I and harvest efficiencies in Table II.

TABLE I

| Distance From Starting Point, m | Total Pulling Force to Drag Seine | | | |
|---|---|---|---|---|
| | Pulling Force, Newtons | | | |
| | Regular Cordage Netting | | Monofilament Netting | |
| | Unsheathed | Sheathed | Unsheathed | Sheathed |
| 4.6 | 129 | 88 | 53 | 49 |
| 9.1 | 178 | 107 | 106 | 83 |
| 13.7 | 182 | 125 | 130 | 72 |
| 18.3 | 222 | 130 | 140 | 71 |
| 22.9 | 227 | 124 | 135 | 76 |
| 27.4 | 236 | 135 | 140 | 82 |
| 32.0 | 227 | 135 | 145 | 89 |
| 36.6 | 231 | 120 | 150 | 98 |
| Average force | 201 | 121 | 125 | 78 |

It can be seen that after 10 m of travel the leadlines of both the unsheathed regular cordage and monofilament nets had dug into the silt. Pulling force in some trials increased by a factor of 2. The sheathed leadlines had much less tendency to dig in and the increase in pulling force is markedly lower.

TABLE II

Improvement in Harvest Efficiency Using Sheathed Leadline*

| Run No. | Efficiency Factor |
|---|---|
| 1 | 1.60 |
| 2 | 1.50 |
| 3 | 1.23 |

*Sheathed vs. unsheathed leadline on standard cordage nets.

Reasons for the improvement in harvest efficiency are not fully understood. It is believed that the sheathing forms a better seal with the bottom to prevent the prawns from escaping beneath the leadline. It may also tend to startle bottom dwelling prawns into swimming upward in to the net.

It should be evident to one skilled in the art that many variations can be made without departing from the spirit of the present invention. The scope of the invention is to be defined only by the following claims.

What is claimed is:

1. In a bottom contacting fish net, the improvement which comprises: flexible tubular bearing means enclosing at least the leadline of the net, the internal diameter of the tubular bearing means being substantially larger than the maximum diameter of the leadline so as to create an open space therebetween, said means having openings permitting free ingress and egress of water into the open space, said openings also providing tying access for joining the leadline to the net, said bearing means serving to reduce frictional forces between the leadline and the bottom substrate.

2. The net of claim 1 in which the bearing means also at least partially encloses an attachment line separate from the leadline.

3. The net of claim 2 in which the attachment line further serves as a foot rope.

4. The net of claim 1 in which the tube is divided into two longitudinally parallel compartments, one containing the leadline and the other an attachment line.

5. The net of claims 1, 2 3, or 4 in which said net is a seine.

6. The net of claims 1, 2, 3, or 4 in which said net is a trawl.

7. The net of claim 1 in which the bearing means is plastic film is in the range from 0.10–0.25 mm (0.004–0.010 in.) in thickness.

8. The net of claims 1, 2, 3, or 4 in which the diameter of the tube is at least twice the diameter of the leadline.

* * * * *